United States Patent

[11] 3,626,796

[72] Inventor David R. Pearl
West Hartford, Conn.
[21] Appl. No. 24,717
[22] Filed Apr. 1, 1970
[45] Patented Dec. 14, 1971
[73] Assignee Gerber Garment Technology
East Hartford, Conn.

[54] SHEET MATERIAL CUTTING APPARATUS WITH FAIL-SAFE MEANS
5 Claims, 5 Drawing Figs.
[52] U.S. Cl.................................................. 83/58,
83/427, 83/433, 83/563, 83/582
[51] Int. Cl........................................................ B26d 5/06
[50] Field of Search........................................... 83/58, 427,
433, 563, 564, 582

[56] References Cited
UNITED STATES PATENTS

| 3,041,907 | 7/1962 | Gallagher, Jr. ............... | 83/582 X |
|---|---|---|---|
| 3,468,204 | 9/1969 | Haas et al. .................... | 83/563 X |
| 3,511,124 | 5/1970 | Bruns............................ | 83/563 X |
| 3,533,320 | 10/1970 | Sederberg .................... | 83/563 X |

Primary Examiner—William S. Lawson
Attorney—McCormick, Paulding & Huber

ABSTRACT: An apparatus for cutting sheet material includes a cutter mounted on an automatically controlled carriage for movement along a desired line of cut relative to an associated surface for supporting one or more layers of material to be cut. The cutter includes a reciprocating cantilevered cutting tool, and means are provided for immediately withdrawing the cutting tool from the material being cut in the event of a power failure to prevent it from cutting as it and the cutter coast uncontrolled to a stop.

Patented Dec. 14, 1971 3,626,796

INVENTOR
DAVID R. PEARL

BY
Attorneys

3,626,796

SHEET MATERIAL CUTTING APPARATUS WITH FAIL-SAFE MEANS

BACKGROUND OF THE INVENTION

This invention relates to an automatically controlled sheet material cutting apparatus and particularly to a mechanism for withdrawing the cutting tool of such an apparatus from the sheet material being cut immediately upon a power failure.

Presently, in the manufacture of garments, upholstery or the like from pieces of fabric or similar sheet material, referred to as pattern pieces, such pattern pieces are often cut by hand moved cutters with electrically driven blades from layups of the sheet material. With such a hand cutter the operator closes a switch to start the reciprocation of the cutting blade and then guides the cutter and its blade along a desired line of cut on the surface of the layup. When the operator desires to cease cutting he returns the switch to its off position or merely holds the cutter stationary, and since the operator always manually controls the position of the cutter, the cutter does not operate uncontrolled in the event of a power failure. However, this is not the case with automatic cutting apparatus of the type having a numerical controller or computer for controlling the movement of the cutter relative to the layup. If a power failure occurs in such apparatus the signal from the controller is lost and no longer controls the travel of the cutter and its cutting blade or tool. The loss of power will, of course, also result in loss of driving power for positioning the cutter and for reciprocating or otherwise moving its cutting tool, but due to inertia the cutter may continue to move and cut for a short time following the power failure as its coasts to a stop. The length of cut made during this short time will usually be very small, however, this may be sufficient to ruin the particular pattern pieces being cut at such time and as a consequence may entail considerable financial loss. Thus, it is desirable that such automatically controlled apparatus have some mechanism for immediately raising the cutting tool above the material being cut when a power failure occurs, and such mechanism should be operable to raise the cutting tool at any given moment without interfering with the normal operation of the cutter.

The general object of the present invention is, therefore, to provide an efficient mechanism for immediately retracting the cutting tool of an automatically controlled sheet material cutter in the event of a power failure and which mechanism can operate at any given moment and does not interfere with the ordinary operation of the cutter.

SUMMARY OF THE INVENTION

In accordance with the invention an automatically controlled apparatus for cutting sheet material includes means defining a material supporting surface, a main carriage mounted for movement in a first coordinate direction relative to said supporting surface, and a tool carriage mounted on the main carriage for movement therewith in the first coordinate direction and for movement in at least a second coordinate direction with respect thereto. A cutter including a cantilevered cutting tool is slidably carried by the tool carriage for movement toward and away from the supporting surface to bring the cutting tool into and out of cutting engagement with the material supported thereby. Biasing means between the tool carriage and the cutter bias the cutter upwardly or away from cutting engagement with the material. Drive means including an electromagnetic clutch are used to move the cutter between its cutting and noncutting positions and to hold it in such positions, and in the event of a power failure the clutch is released to allow the cutter to be moved to its noncutting position by the biasing means.

DETAILED DESCRIPTION OF THE PREFERRED EMBODIMENT

Figure 1:
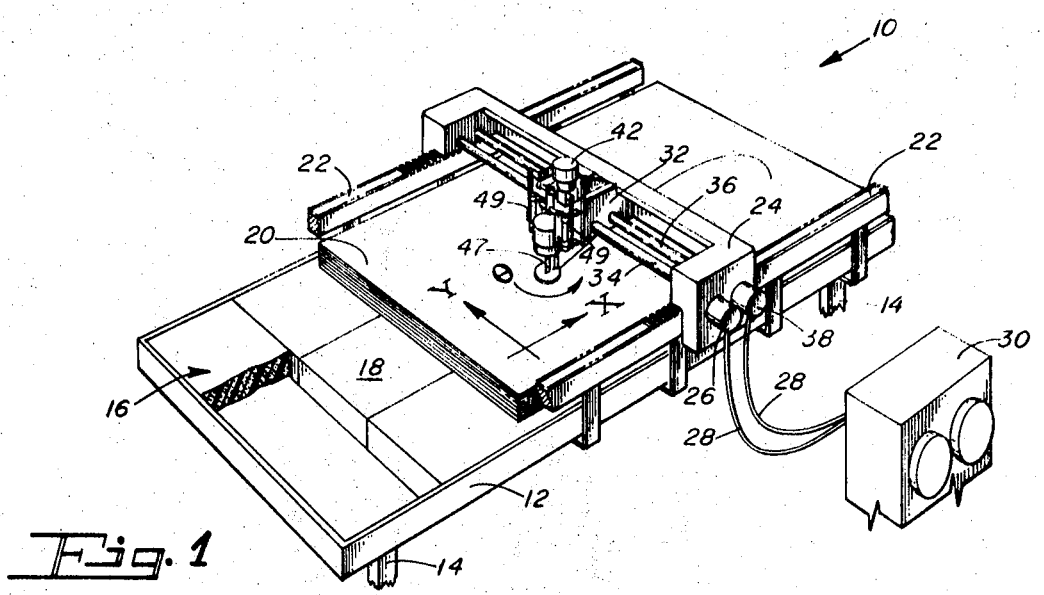
FIG. 1 is a fragmentary perspective view of a cutting apparatus embodying the present invention.

Garments, upholstery and other fabric items are normally formed from a number of pattern pieces sewn to one another. These pattern pieces are in turn often cut from layers of fabric which are first spread one on top of the other to form a layup. A cutter, either manually or automatically controlled, then passes over the layup and cuts the pattern pieces therefrom. An automatically controlled cutting apparatus for performing this operation, and embodying the present invention, is shown in FIG. 1 and indicated generally by the reference numeral 10. It includes a table 12 having support legs 14, 14 and including a bed of penetrable material 16 which forms a supporting surface 18 for the material to be cut, shown as a layup 20. The bed of penetrable material 16 is formed from a material that can easily be penetrated by the cutting tool and may, or example, be a plastic porous foam material such as Ethafoam, a foamed polyethylene manufactured by the Dow Chemical Company. A detailed description of the bed of penetrable material 16 as well as of other related features is contained in U.S. Pat. Application, Ser. No. 821,723, filed May 5, 1969, and entitled "Apparatus For Cutting Sheet Material," to which reference may be made for a further understanding of these features.

Racks 22, 22 are located along the longitudinal sides of the table 12 and support a main carriage 24 which rides therealong longitudinally of the table, or in the illustrated X direction. Pinions (not shown) in the main carriage 24 engage the racks 22, 22 and are driven by a motor 26 which receives signals through the line 28 from an associated numerical controller or computer 30 to drive the carriage 24 in the X direction. A tool carriage 32 rides on a guide rod 34 and lead screw 36 of the carriage 24. The lead screw 36 is driven by an associated motor 38, which also receives signals from the controller 30 through the line 28, and engages a nut member (not shown) of the tool carriage 32 to drive the latter transversely of the layup 20, or in the illustrated Y direction. By these means, the tool carriage 32 and the cutter mounted thereto can therefore be moved along any desired line of cut on the surface of the layup 20 to cut desired pattern pieces from the layup.

Referring to FIGS. 2 to 5, the cutter is indicated at 41 and is carried by a frame 40 in turn mounted on the tool carriage 32. The frame 40 has an angled back piece 50 attached to the carriage 32 by screws 52, 52, 52, 52. It also has a vertical plate 51 to which are attached a pair of lower arms 53, 53 and a pair of upper arms 54, 54 each of which arms projects forwardly from the plate 51. The arms 53, 53 and 54, 54 support two cylindrical guide ways 57, 57, as shown, which in turn slidably receive a sliding frame or crosspiece 64. The crosspiece 64 has the cutter 41 fixed thereto so that by sliding the crosspiece vertically along the guide ways 57, 57 the cutter may be moved toward and away from the surface 18 of the table and to bring its cutting tool into and out of cutting engagement with the layup 20 or other material to be cut received on the surface 18. The cutter 41 is of the type which has a cantilevered cutting tool 47. This tool may take various different forms without departing from the broader aspects of the invention and may for example be a knife blade driven in a reciprocating motion along its longitudinal axis and relative to the body of the cutter 41 by a motor in such body, another motor also being provided for rotating the blade about its axis of reciprocation to maintain it tangent to the line of cut. By way of further example, the tool 47 could take the form of any of the reciprocating or rotary tools shown in more detail in the aforesaid pending application.

Figure 3:
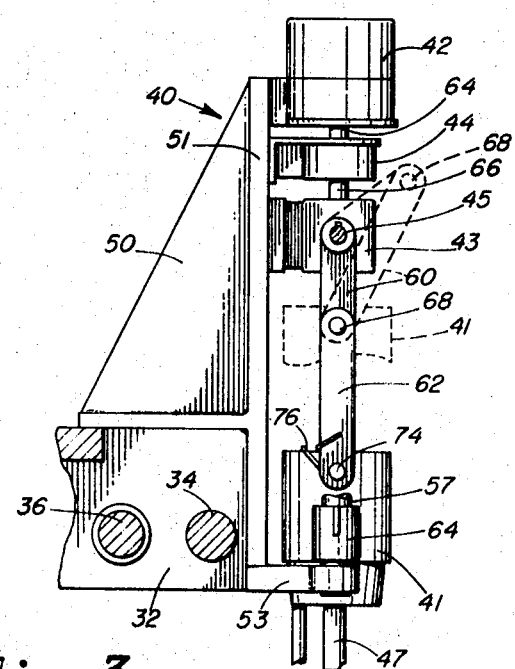
FIG. 3 is a fragmentary sectional view taken generally along the line 3—3 of FIG. 2.
Figure 4:
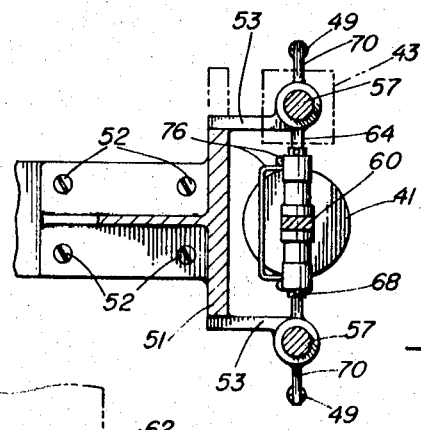
FIG. 4 is a fragmentary sectional view taken generally along the line 4—4 of FIG. 2.
Figure 5:
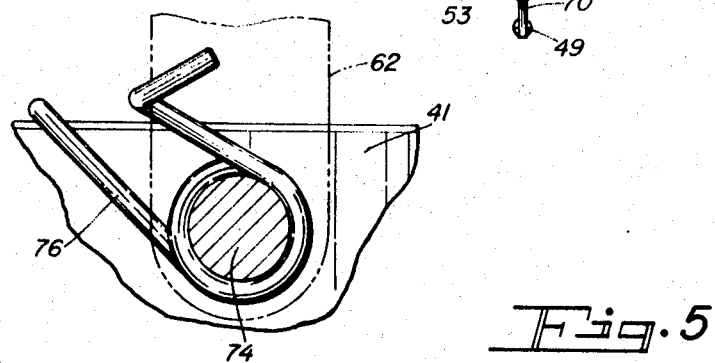
FIG. 5 is an enlarged fragmentary sectional view taken generally along the line 5—5 of FIG. 2.

In FIG. 3, the solid lines show the crosspiece 64 and cutter 41 in their lowered positions at which the tool 47 is in cutting engagement with the material to be cut and the broken lines show such parts in their raised positions at which the tool 47 is out of cutting engagement with the material. When the tool is in cutting engagement with the cloth it may, and preferably does, if it is a reciprocating tool penetrate the surface 18 of the bed 16 during at least a portion of each of its reciprocating cutting strokes similarly to the reciprocating tools shown in the aforesaid pending patent application.

The crosspiece 64 and the cutter 41, in accordance with the invention, are biased to their raised positions and are driven between their raised and lowered positions by a motor operating on the cutter through a drive train including an electromagnetic clutch which upon a power failure is deenergized and released to allow the crosspiece and cutter, if in their lowered positions, to be raised by the biasing means. The biasing means and drive mechanism may take many different forms, but in the illustrated figure the biasing means comprises two tension springs 49, 49 each connected between one of two arms 70, 70 on the crosspiece and an associated one of two brackets 72, 72 fixed to the frame plate 51. The drive motor is self-braking reversible electric motor 42 and the drive train includes an electromagnetic clutch 44, a bevel gear unit 43, a shaft 45, a crank arm 60 and two links 62, 62. The motor 42 is connected to the input of the clutch by a shaft 64 and the output of the clutch is connected to the bevel gear unit 43 by a shaft 66. The clutch is normally energized (engaged) during operation of the cutting apparatus 10 so that as the motor 42 rotates in one direction or the other, the shaft 45 is driven thereby in one direction or the other.

Figure 2:
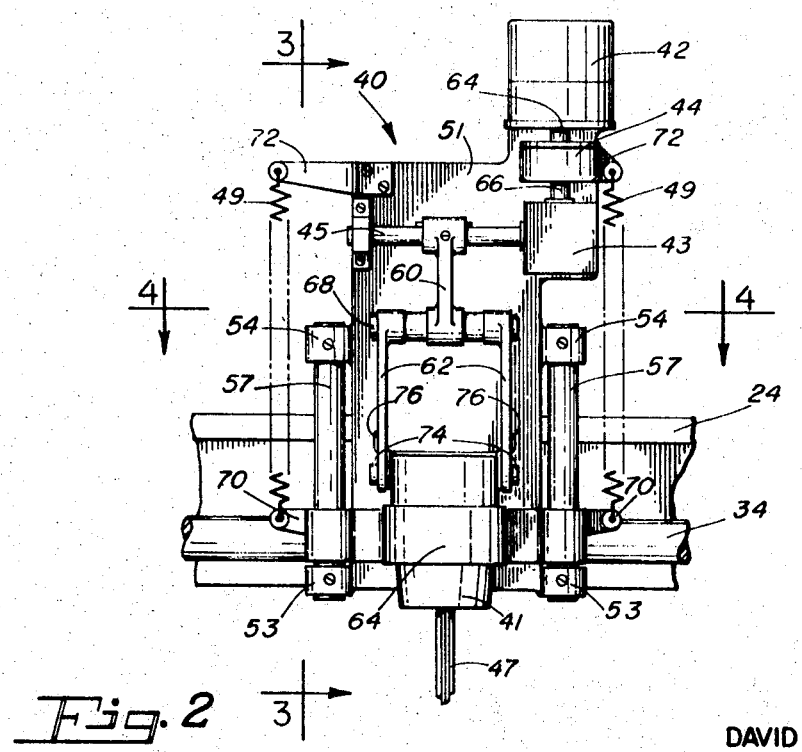
FIG. 2 is an enlarged front elevational view of the cutter of FIG. 1 and of its associated supporting and driving mechanism.

The crank arm 60 is fixed to the shaft 45 so as to rotate therewith, and at its other end has fixed thereto a shaft 68 arranged parallel to the shaft 45. The shaft 68 extends to either side of the crank arm 60 and at each end rotatably receives one of the two similar links 62, 62. The opposite end of each link 62, as shown best in FIG. 2, is rotatably connected to an associated one of two trunnions 74, 74 on the body of the cutter 41. It will therefore be appreciated that as the shaft 45 is rotated first in one direction and then the other by the motor 42, the cutter 41 and crosspiece 64 are raised and lowered by the crank arm 60 and links 62, 62, as evident from FIG. 3.

The cutter 41 and crosspiece 64 are prevented from being locked in their lowered position during a power failure, as a result of the axis of the trunnions 74, 74, the axis of the shaft 68 and the axis of the shaft 45 being in line with one another, by a biasing spring 76 which biases the links 62, 62 to move the shaft 68 away from such in-line or dead-centered relation with the shaft 45 and trunnions 74, 74. That is, as viewed in FIG. 3, when the cutter 41 is in its lowered position, the axes of the trunnions 74, 74, the shaft 68 and the shaft 45 all lie in the same vertical plane. If a power failure should occur at this time, the main biasing springs 49, 49, without the aid of the spring 76 might not b able to shift the axis of the shaft 68 as necessary to initiate the upward movement of the cutter and the blade 47 would accordingly continue to engage and cut the layup 20. However, the spring 76 avoids this possibility by biasing the shaft 68 to an out of line position relative to the trunnions 74, 74 and the shaft 45, thereby assuring that the linkage will not assume a locked condition.

From the foregoing it will therefore be appreciated that the illustrated mechanism or raising and lowering the cutter 41 acts as a fail-safe device for preventing damage to the material being cut by the cutter in the event of a power failure. If power does fail the controller 30, which is dependent on such power, stops sending position signals to the carriage drive motors 26 and 38 and the cutter moves to a stop. This stop, because of inertia, may not occur instantly and the cutter may travel uncontrolled for a small distance until reaching a stationary condition. Nevertheless, at the instant the power failure occurs the clutch 44 is disengaged, as a result of being deenergized by the loss of power, allowing the springs 49, 49 to immediately withdraw the cutter from cutting engagement with the layup 20 so that during the major portion of the uncontrolled travel of the cutter, it is out of cutting engagement therewith.

I claim:

1. An apparatus for cutting sheet material, said apparatus comprising means defining a material supporting surface, a cutter having a cantilevered cutting tool, a support for said cutter, electrically powered means for automatically moving said cutter support and said supporting surface relative to one another to cause said tool to follow a desired line of cut on material supported by said supporting surface, means supporting said cutter for movement relative to said support between a first position at which said tool is in cutting engagement with the material supported by said supporting surface and a second position at which said tool is out of cutting engagement with the material supported by said supporting surface, means for driving said cutter between said first and second positions relative to said support, and means for moving said cutter to said second position immediately upon a failure of power to said electrically powered means.

2. An apparatus for cutting sheet material as set forth in claim 1 further characterized by said means for moving said cutter to said second position immediately upon a power failure including biasing means for biasing said cutter toward said second position relative to said support.

3. An apparatus for cutting sheet material as set forth in claim 2 further characterized by said means for driving said cutter between said first and second positions relative to said support including a motor and a drive train between said motor and said cutter, and said means for moving said cutter to said second position immediately upon a power failure including an electromagnetic clutch in said drive train which clutch upon deenergization releases said cutter from said motor to allow said biasing means to move said cutter toward said second position.

4. In an electrically operated automatically controlled apparatus for cutting sheet material positioned on a supporting surface, the combination comprising a cutter having a cutting tool, a support frame for said cutter, means supporting said cutter on said support frame for movement toward and away from said supporting surface, first biasing means between said cutter and said support frame for baising said cutter away from said supporting surface, a drive train for moving said cutter toward and away from said supporting surface, an electromagnetic clutch included in said drive train, and a motor connected to said drive train for powering it to move said cutter through said electromagnetic clutch.

5. The combination set forth in claim 4 further characterized by said motor being a self-braking electric motor.

* * * * *